(12) United States Patent
Pleyers et al.

(10) Patent No.: US 6,572,927 B1
(45) Date of Patent: Jun. 3, 2003

(54) METHOD FOR SEALING POROUS BUILDING MATERIALS AND BUILDING COMPONENTS

(75) Inventors: Gerd Pleyers, Bertha-von-Suttner-Str. 33, D-52146 Würselen (DE); Klaus Littmann, Geilenkirchen (DE)

(73) Assignee: Gerd Pleyers, Würselen (DE)

( * ) Notice: Subject to any disclaimer, the term of this patent is extended or adjusted under 35 U.S.C. 154(b) by 0 days.

(21) Appl. No.: 09/720,415

(22) PCT Filed: Jun. 23, 1998

(86) PCT No.: PCT/DE99/01825

§ 371 (c)(1),
(2), (4) Date: Dec. 21, 2000

(87) PCT Pub. No.: WO00/00451

PCT Pub. Date: Jan. 6, 2000

(30) Foreign Application Priority Data

Jun. 29, 1998 (DE) .......................... 198 28 714

(51) Int. Cl.[7] .............................. B05D 3/02; C09K 3/00
(52) U.S. Cl. ................. 427/393.6; 427/385.5; 427/386; 252/382; 252/384
(58) Field of Search ............... 427/385.5, 386, 427/393.6; 252/380, 382, 384

(56) References Cited

U.S. PATENT DOCUMENTS

| | | | |
|---|---|---|---|
| 4,330,595 A | 5/1982 | Tanaka et al. | |
| 4,758,295 A | * 7/1988 | Sawaide et al. | ............... 156/98 |
| 5,268,392 A | 12/1993 | Bertram | |

FOREIGN PATENT DOCUMENTS

| | | |
|---|---|---|
| DE | 19503284 | 8/1996 |
| DE | 19526151 | 1/1997 |
| EP | 0159035 | 10/1985 |
| EP | 0381096 | 8/1990 |
| GB | 2240977 | 8/1991 |
| GB | 2240977 A * | 8/1991 |
| SU | 1588737 A * | 8/1990 |

* cited by examiner

*Primary Examiner*—Michael Barr
(74) *Attorney, Agent, or Firm*—Collard & Roe, P.C.

(57) ABSTRACT

A method for sealing porous building materials, using a polyurethane and/or epoxy resin based sealing composition. The composition can include a substance/substance mixture with a viscosity of less than 100 mPa·s at 12° C. which can be added to a porous building material. This substance/substance mixture can be based on an epoxy resin. This resin can chemically react once inside of a porous region of the building material to substantially fill the pore system.

11 Claims, 3 Drawing Sheets

METHOD FOR SEALING POROUS BUILDING MATERIALS AND BUILDING COMPONENTS

CROSS REFERENCE TO RELATED APPLICATIONS

Applicants claim priority under 35 U.S.C. §119 of German Application 198 28 714.3 filed Jun. 23, 1998. Applicants also claim priority under 35 U.S.C. §371 of PCT/DE99/01825 filed on Jun. 23, 1999. The international application under PCT article 21 (2) was not published in English.

The present invention relates to a method for sealing porous building materials. In the following, the term "building materials" is understood to relate also to building components (e.g. brick walls, pillars) consisting of such building materials, as well as building structures (e.g. bridges). Furthermore, the invention relates to a sealing composition and in particular to its use in conjunction with the present method. The field of application includes all types of porous building materials that may be in contact with liquid.

For example, building components in contact with soil are in direct contact with-water present in the soil. A distinction is made in this connection between the following load cases:

Soil moisture (water present in the soil that is capillary-bound and can be expelled also against the force of gravity).

Non-Pressing water (e.g. precipitation water, seepage water or tap water in the drippable-liquid form, which exerts no or temporarily only low hydrostatic pressure on the sealing).

Pressing water (permanently exerts hydrostatic pressure on the sealing).

Building components that are in contact with soil are sealed in conjunction with new building structures within the framework of the raw construction measures, as well as later if the building substance has to be repaired, and in connection with sealing work that has been carried out in a defective manner.

Within the framework of new construction measures, sealings (e.g. of brick work adjoining the soil) are flatly applied externally or installed in the bearing joints of the rising brickwork as a so-called horizontal barrier. Both measures may be implemented jointly as well. The constructional design as well as associated material selections are specified in DIN 18 195.

"Bauwerksabdichtungen" [Building Structure Sealings], Parts 1 to 10, Berlin: Beuth Publishing Company; and in the ibh-Specifications "Bauwerksabdichtungen mit kaltverarbeitbaren, kunststoffmodifizierten Beschichtungsstoffen auf Basis von Bitumenemulsionen" [Building structure sealings with cold-processible, plastic-modified coating substances based on bitumen emulsions](July 1993), and "Bauwerksabdichtungen mit zementgebundenen starren und flexiblen Dichtungsschlämmen [Building structure sealings with cement-bound rigid and flexible sealing slurries] March 1992". The publisher in each case is the "Industrieverband Bauchemie und Holzschutzmittel e.V", Frankfurt.

Sealing measures implemented at a later time are, as a rule, carried out for the purpose of making repairs because of missing or on defective horizontal barriers, and, if need be, are carried out in conjunction with a vertical barrier located on the inside. At the time repairs are made, the outer zone is normally not accessible or only with substantial expenditure.

The load cases described herein are in the same sense applicable also to building materials and building components that are not in contact with soil, but which may come into contact with water because of the environmental conditions.

Building components that are in contact with soil and consist of water-impermeable concrete (WI-concrete) take up a special position. In these cases, the work joints (e.g. wall-soil interface) are sealed, for example by injection within the framework of the raw building measure. Other fields of application are, for example:

Protection of reinforced concrete against corrosion by repelling water or chloride solutions (see also "Korrosionsschutzprinzip WI" [principle of protection against corrosion] according to "Richtlinie für Schutz und Instandsetzung von Betonbauteilen Teile 1 bis 4" [Guideline for the protection and repair of concrete building components], Berlin: Deutscher Ausschuss fuar Stahlbeton, DAfStb, 1991–1992)

Protection of porous building materials against environmentally hazardous liquids (e.g. building components serving as secondary barriers—gas stations, collecting troughs etc.).

STATE OF THE ART

The current state of the art with respect to the practice of sealing porous building materials and building components is listed in the following table.

| SEALING MEASURE | | MATERIALS/METHODS (Examples) |
|---|---|---|
| Sealing against water | | |
| New buildings | Vertical sealing (against soil, flat application) | Thick bitumen coating (surface coating with spatula). |
| | Horizontal sealing | Insertion of bitumen or plastic webs in bearing joint of brickwork. |
| | Later sealing of work joints (WI-concrete) | Joint strips set in concrete. insertion of swelling strips prior to concreting Insertion of injection hoses prior to concreting; injection of polyurethanes, micro-concrete suspensions or similar materials after concreting. |
| Repairs (new and old buildings) | Vertical sealing (on side of inner space, flat application) | Flexible or rigid sealing slurries Water-impermeable plasters |
| | Horizontal sealing | Horizontal cutting method with later installation of e.g. plastic-reinforced bitumen webs. Corrugated stainless steel sheets rammed in. Bored hole injection method (pressure or pressureless application of water-soluble or solvent-containing materials) |
| Sealing against other liquids | | |
| New and old Buildings | Vertical sealing (wall surfaces) | Flat coating (several layers, as a rule) |
| | Horizontal sealing (bottom surfaces) | Flat coating (several layers, as a rule), taking into account adequate non- |

| SEALING MEASURE | MATERIALS/METHODS (Examples) |
|---|---|
| -continued | |
| | skid quality, resistance to wear; in combination with fused bitumen webs, if need be (see also special bridge sealings) |

The above overview shows four important procedures employed for sealing building components that are in contact with soil:

(1) The sealing is applied to a substrate (concrete, brickwork etc.). With a sealing arranged against the soil, a "positive hydrostatic pressure" is assumed to be the load case, and with an arrangement in the inner side a "negative hydrostatic pressure". The materials employed in this area can be subdivided in three groups (FIG. 1): Impregnations penetrate the space of the pores to about 1 to 30 mm and act through a change in the surface properties of the pore walls without filling the pores or forming closed films (FIG. 1a). Sealings penetrate the space of the pores to about 1 to 3 mm and completely fill said space and coat the outer surface of the building material with a thin film (FIG. 1b). Coatings do not, or only to a minor degree penetrate the building material. Such coatings act through a coating on the outer surface of the building material (FIG. 1c).

(2) The sealing is installed at a later time by injection in a gap or crack (water-impermeable concrete work joint or the like), whereby the gap or crack is filled with a sealing material, but the pore system of the building material remains unaffected to the greatest possible extent.

(3) The sealing is installed at a later time by injection in the pore system; the pore system of the building material is filled to the extent permitted by the solids content of the injected material and the depth of penetration. As a rule, the materials used heretofore cannot completely fill the pore system after they have cured.

(4) The pore system is mechanically severed and partially replaced by impermeable filling bodies.

Not all procures can be applied to porous building materials and building components that are not in contact with the soil but may be in contact with water or other liquids because of the environmental conditions.

Drawbacks of the Current Methods

Sealing porous building materials and building components on the inner side requires both special materials and constructional solutions that permit absorption of negative hydrostatic pressures, i.e. to withstand the tensile stresses exerted by the acting hydrostatic pressure. Special coatings that are impermeable to liquid are often applied to the brickwork in several layers up to several centimeters thick, or "WI concrete troughs" extending across the entire soil-contacted range of the inner space are employed. Both methods require very high expenditure with respect to material and labor costs.

External sealing against water is carried out with bituminous materials. In this case, preferably so-called thick bitumen coatings are used that are not resistant to external mechanical influences. Such coatings are characterized by high material costs. Damage may be caused, for example by pointed objects (brick fracture etc.) that perforate the soft bitumen compound when the construction pit is refilled. Since the coatings do not fill the pore space, the building material is directly accessible to water if the coating is damaged.

External sealings against environmentally hazardous fluids are produced in the form of costly coatings.

Low-viscosity, partially hydrophobing materials that do not fill the pores are often used for later sealing with the help of injection. Materials known heretofore that work on the principle of pore-filling are not capable of filling the pores completely (cf PLEYERS, G.: "Is Pore Constriction Suitable For Reducing Brickwork Moisture Due to Capillary Rise?" Stuttgart: Fraunhofer IRB Publishing Co., 1998—In Annual Reports "Steinzerfall" [Stone Decomposition]—Steinkonservierung [Stone Preservation] Vol. 6, 1994–1996, (Snethlage, R. (Ed.)), pages 157–163, 1998). The results of a completed research project show that all injection materials currently available on the market for the purpose of sealing against water are unsuitable for later sealing of water-saturated brickwork (cf SASSE, H. R.; PLEYERS, G.: Reduzierung von Mauerwerksfeuchte—Untersuchung und Entwicklung chemischer Bohrlochinjectionsverfahren als wirksame Horizontalsperre für den nachtraglichen Einbau in Ziegelmauerwerk [Reduction of brickwork moisture—Investigation and development of chemical bored-hole injection methods as an effective horizontal barrier for later installation in brickwork]; Aachen: Institut fur Bauforschung, 1997—Research Report No. 496, 1997, IRB Publishing Company). As it has to be assumed in connection with sealing work that is done at a later time that a water-saturated pore system has to be dealt with at the time an injection measure is implemented, there is a need for efficient materials and methods especially in this area of sealing technology.

SUMMARY OF THE INVENTION

Problem of the Invention

The problem of the invention is substantially the sealing of porous building materials and building components.

All commonly used building materials are taken into account, for example materials such as
- cement-bound building materials such as concrete materials, mortars, pumice construction materials, porous concrete materials and plasters;
- brick building materials such as highly perforated bricks and solid bricks;
- lime-bound building materials such as sand lime bricks, lime plasters and lime mortars;
- natural stones such as sandstone materials; tufa material.

All considerable liquids are taken into account, for example such as:
- water;
- salt solutions;
- liquids posing a hazard to the environment.

The sealing has to act effectively in all load cases specified above (moisture, non-pressing liquids, as well as positive and negative hydrostatic pressure).

The materials employed have to be applicable by all application methods (e.g. brush application, flooding, spatula application, injection without and with pressure).

The effectiveness of the sealing has to be permanently assured at any degree of underground moisture up to water saturation at the time of treatment.

It must be possible to employ required application techniques and materials more economically than those used until now.

The resistance to negative water pressure has to be increased vis-a-vis known systems.

The sensitivity to damage (e.g. caused by improper construction pit filling) has to be reduced vis-a-vis known systems.

In special cases, the sealing has to be suitable for increasing the resistance to wear of the treated building component, and, if need be, also for increasing its anti-skid property (e.g. in conjunction with surfaces of parking decks on which vehicles drive).

Solution of the Problem

For penetrating the pore system of commonly used building materials (see examples above), one- or multi-component materials have to be used which (1) are low-viscous ((if possible<100 mpa·s at 12° C.) and free of solvent; which form pore-filling compounds by reaction after the building material has been treated; and which upon curing have an adequately pronounced swelling power by means of the liquid they are in contact with; or (2) which are low-viscous (if possible<100 mPa·s at 12° C.); which in the course of the reaction following the treatment of the building material increase their volume, for example by foaming; and which upon curing have a sufficient pronounced swelling power by means of the liquid they are in contact with.

Both approaches to the solution have in common that the pores of the treated construction material are completely sealed, either by complete filling with the materials or by complete filling with a closed-cell foam.

Materials according to approach 1 to the solution are, for example highly fluid epoxy resins consisting of solvent-free aliphatic, multifunctional reactive thinners, and aminic, aliphatic hardeners, which are mixed shortly before they are applied. For brush and spatula applications it is possible to control the consistency from highly liquid to pasty by using suitable adjusting agents.

Materials according to approach 2 to the solution are, for example modified polyurethane prepolymers with isocyanate contents between 2 and 30%, which are dispersed with 40 to 95 m-% water immediately prior to their application with suitable emulsifiers, or dissolved with 40 to 95 m-% of a suitable solvent. Catalysts promote strong foaming for the purpose of increasing the volume. The formation of foam can be promoted further by foam stabilizers. For brush and spatula applications it is possible to adjust the consistency from highly fluid to pasty, for example by using suitable adjusting agents.

Furthermore, the type of application employed has to be adapted depending on the water content of the underground to be treated. Such adaptation leads to a specific type of effect of the materials.

Dry underground (absorbent, i.e. pressureless impregnation, which is possible, for example by flat application, or pressureless injection).

The sealing material can be absorbed in the pore system by capillary forces, where it then can cure. An effective sealing develops that can be improved further by admitting liquid. The material penetrates far into the pores and sets as a massive closure (FIG. 2a) or in the form of a closed-cell foam (FIG. 2b).

Moist underground (limited absorptive capacity, i.e. pressureless impregnation is still possible, for example by flat application or pressureless injection).

The sealing material can be absorbed into the pore space by capillary forces and can cure there. As the walls of the pores are wetted by a film of water at the time of application, an effective sealing can be installed only if the following conditions are taken into account:

The sealing material penetrates the pore space, fills it up to the water-wetted zone of the pore walls, and cures in that condition. Own tests have shown that after the installed material has cured, the zone of the pore walls continues to have the capillary capacity of an untreated pore system.

The water transport capability particularly of the water-wetted zone of the pore walls is reduced to an adequate extent by suitable measures or their combination. Such measures may be:

Following curing, adequate swelling power must be available if water is present in order to close the water-wetted zone of the pore walls in a sealing manner (FIGS. 2a and 2b).

During curing, the water is removed from the pore walls by mixing or chemical reaction and a direct contact of the injected material with the pore walls is thus produced (FIGS. 2a and 2b).

Water-saturated underground (not absorbent, i.e. pressure application is required).

In order to obtain the desired building material volume it is necessary for the sealing material to expel the water present in the pore system by pressure injection. However, an unavoidable film of water remains on the walls of the pores. The situation after pressure injection corresponds with the one after injection without pressure on a moist underground.

Therefore, the materials for pressure injection must have the same properties as specified above so that the final condition shown in FIGS. 2a and 2b is achieved.

What applies in addition is that pressure application must not cause any excessive mixing with the water present in the pore system.

Advantages of the invention

The invention is capable of sealing any type of porous building materials and building components, for example:
cement-bound building materials such as concrete, mortars, pumice building materials, porous concrete and plasters;
brick building materials such as highly perforated bricks and solid bricks;
lime-bonded building materials such as sandy limestone, lime plasters and lime mortar;
natural stones such as sand stone, tufa and limestone.

The invention is capable of sealing against any type of liquid, for example:
water;
salt solutions;
liquids posing a hazard to the environment.

The sealing acts in all load cases (moisture, nonpressing liquids, as well as positive and negative hydrostatic pressure).

The materials employed can be applied by all application methods (e.g. brush application, application by flooding, spatula application, injection without and with pressure).

The effectiveness of the sealing is permanently assured in conjunction with any degree of underground moisture up to water saturation at the time of application.

For installation by means of pressure injection it is possible to permanently assure in particular the effectiveness of the sealing in conjunction with moist and water-saturated pore systems.

Improvement of the economy over conventional systems is assured because the products used are chemicals that can be produced at favorable cost.

The use as a flat sealing requires far less material as compared to thick coatings. As compared to conventional systems, the economy is therefore improved to a special extent for this case of application.

The effectiveness and durability in the load case "negative water pressure" are decisively increased as compared to conventional systems because the materials are anchored in the pore system.

The sensitivity to damage (e.g. due to improper filling of the construction pit) is reduced versus known systems because no applied coating is present but rather a sealing in the pore space of the building material. The building material protects the sealant against mechanical influence.

In special cases, e.g. in conjunction with surfaces of parking decks subjected to vehicular traffic, it is possible with the sealing as defined by the invention to satisfy in addition to protection against corrosion the requirements with respect to resistance to wear of the treated building component, as well as the non-skid quality. As opposed to conventional methods, no additional measure (e.g. additional layer of quartz sand) is required.

DESCRIPTION OF EXEMPLIFIED EMBODIMENTS

Figure 1A:
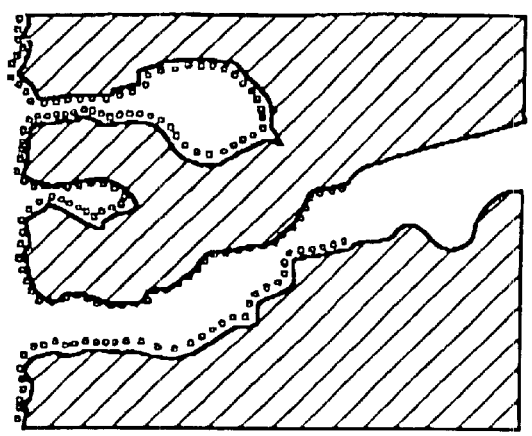
FIG. 1A is a cross sectional view of a building material wherein impregnations are shown inside pores or cracks without filling these pores or cracks.
Figure 1B:
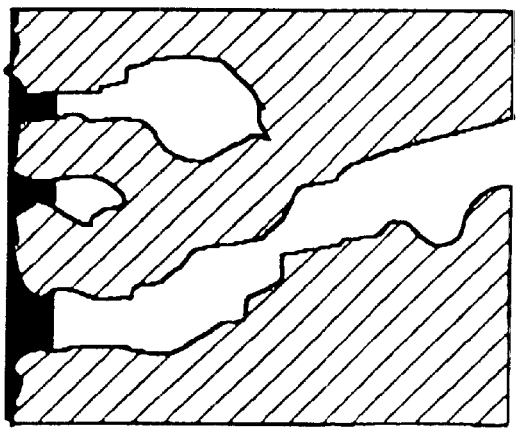
FIG. 1B is a cross-sectional view of a building material wherein this sealant penetrate the cracks and seal an outer surface of the cracks.
Figure 1C:
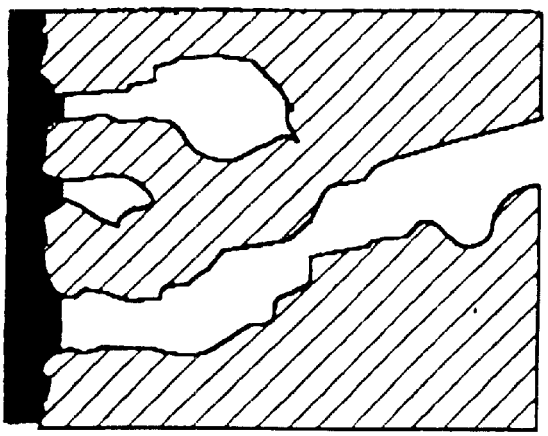
FIG. 1C shows coatings only on an outer surface of the building material.
Figure 2A:
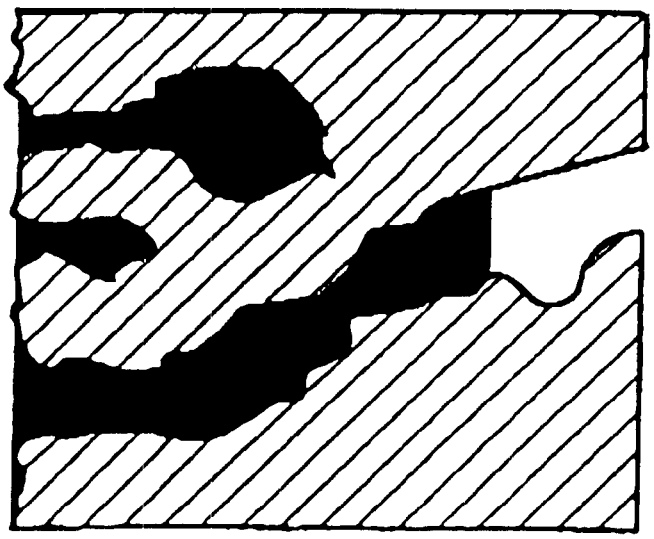
FIG. 2A shows the sealant penetrating far into the building material.
Figure 2B:
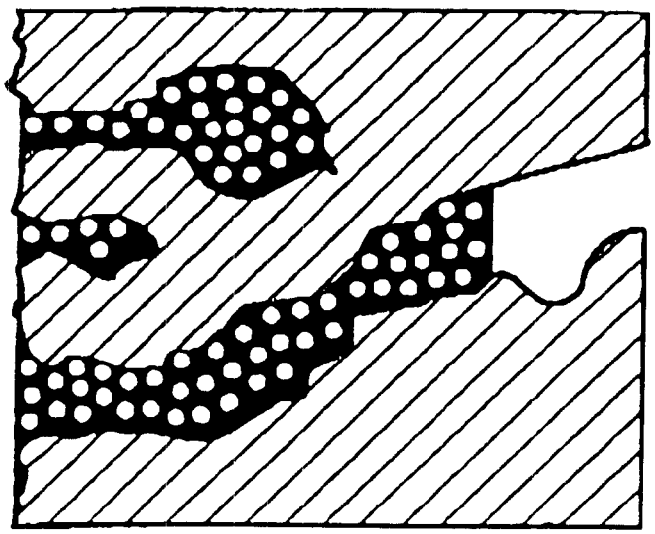
FIG. 2B shows the use of the sealant in the form of a closed cell foam.
Figure 3:
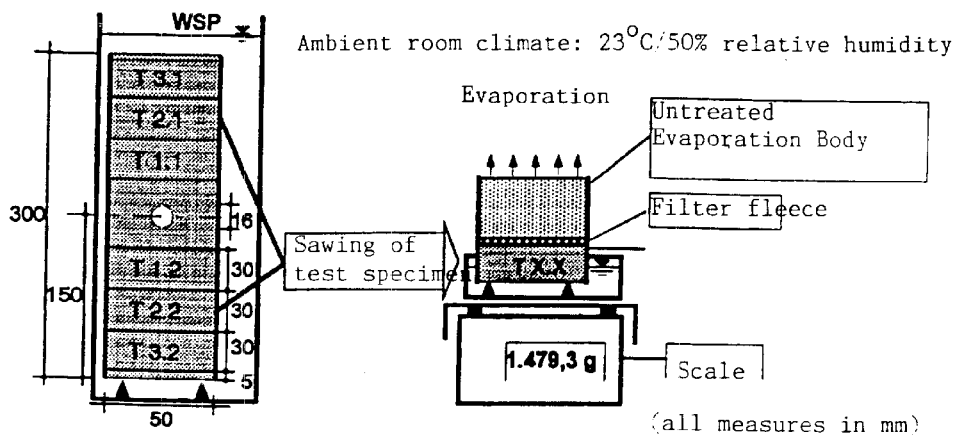
FIG. 3 shows a block diagram description of laboratory tests for the invention.

Laboratory tests according to FIG. 3 were carried out for demonstrating the effectiveness of commercially available products and of the materials as defined by the invention. The test arrangement is shown and explained in great detail in SASSE, PLEYERS (see above). The test is briefly outlined in the following.

A highly fluid two-component epoxy resin consisting of the product Bakelite® EPD-HD (A) with the hardener Rütadur® TMD (B) was used in said test with a mixing ratio of (A) to (B) such as 100 to 29 parts by mass. Said substances are commercial products of the corporation Bakelite AG, Varziner Strasse 49, 47125 Duisburg. In addition to Rütadur® TMD there can be reactive thinners consisting of di or oligo-functional epoxy compounds and hardeners which use adjusting agents.

Flank-sealed natural stones with the dimensions 300 mm by 50 mm by 50 mm were saturated with water by admitting water up to mass constancy. The water-saturated natural stones were injected into a drilled hole located in the center of the stone, with an injection pressure of about 6 bar (see FIG. 3, left). In each case, the amount of epoxy resin injected sufficed for filling the entire accessible pore system of the natural stone by pressureless water absorption.

After a subsequent 24-hour storage period with storage under water at 23° C., the test specimens as shown in FIG. 3 were prepared and tested with respect to tightness.

By weighing the stone specimens prepared as shown in FIG. 3 it is possible to determine the capacity of the disks from different depths for their capillary transport of water. The water present in the container can evaporate only if it passes through the prepared sections of the stone. If no water evaporates, the pores of the stone are completely sealed. The actually evaporated amount of water is put into relation to the surface of the stone and stated in $kg/(m^2 \cdot d)$.

Figure 4:
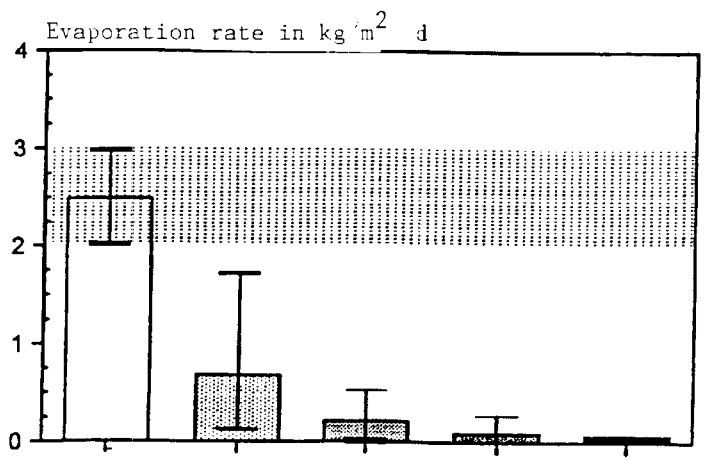
FIG. 4 shows a plotting of the evaporation of the sealant over time.

The amounts of evaporation found in the present test after 3, 5, 17 and 44 days as compared to the amount of evaporation of an untreated stone are plotted in FIG. 4. It is clearly shown that the amount of water transported by the treated stone is lower than the one transported by the untreated stone, and that the amount decreases further in the course of time. The material swells through the water present and reduces the transport capacity of the pores down to a value of about $0.02-0.03$ $kg/(M^2 \cdot d)$.

It was found and explained in detail in SASSE, PLEYERS (see above) that the transport capacity of the pores has to be reduced to a value of less than 0.1 $kg/(m^2 \cdot d)$ in order to assure the effect of a horizontal barrier in the brickwork. Furthermore, commercially available products were tested for the present case of application, following the same test procedure. None of the tested, commercially available products reached the limit value specified above. All products permitted transport rates of 0.5 $kg/(m^2 \cdot d)$ and higher.

The test clearly underlines the special suitability of the method as defined by the invention as well as of the sealing composition as defined by the invention.

What is claimed is:

1. A method for sealing a porous building material comprising the steps of:

feeding at least one low-viscosity reactive substance/substance mixture with a viscosity of less than 100 mPa·s at 12° C. to the porous building material, whereby the substances/substance mixtures are based on epoxy resins consisting of solvent-free aliphatic, multifunctional reactive thinners and aminic aliphatic hardeners and/or polyurethane polymers with isocyanate contents of between 2 and 30 wt %;

permitting said substance/substance mixture to penetrate the pore system of the porous building material in a desired zone of influence; and chemically reacting said substance/substance mixture which substantially fills the pore system, and thereby forms a liquid-impermeable barrier in the pore system.

2. The method according to claim 1, wherein the step of chemically reacting said substance/substance mixture includes curing of the substance/substance mixture.

3. The method according to claim 1, wherein the step of chemically reacting includes the steps of foaming and curing the substance/substance mixture.

4. The method according to claim 1, wherein following the step of chemically reacting the substance/substance mixture the substance/substance mixture has in the presence of liquid, adequate swelling power for closing in a sealing manner residual volumes of the pores not filled with material.

5. The method according to claim 1, wherein the step of chemically reacting the substance/substance mixture substantially removes the liquid present on the walls of the pores; and wherein the pores are closed in as sealing manner by direct contact of said substance/substance mixture with the pore walls.

6. The method according to claim 1, wherein the reactive substance/substance mixture fully reacts in a water-repelling (hydrophobic) manner and wherein a water transport process is stopped in residual volumes of the pores not filled with material.

7. The method according to claim 1, wherein said step of permitting said substance/substance mixture to penetrate the pore system of the porous building material includes pressure application of said substance/substance mixture in a water-saturated underground which does not cause excessive mixing with the water present in the pore system, but adequate expelling of the water.

8. A sealing composition consisting of:
a low-viscosity substance/substance mixture with a viscosity of less than 100 mPa·s at 12° C., whereby said substance/substance mixture based on epoxide resins consisting of solvent-free aliphatic, multifunctional reactive thinners and aminic aliphatic hardeners and/or polyurethane prepolymers with isocyanate contents of between 2 and 30 wt %, said composition, upon installation in porous building materials forming pore-filling masses by chemical reaction, curing, and swelling upon curing by means of the liquid present.

9. The sealing composition according to claim 8 at least consisting of a mixture of reactive thinners in the form of di- or oligo-functional epoxy compounds and hardeners.

10. A sealing composition consisting of:
a low-viscosity substance/substance mixture with a viscosity of less than 100 mPa·s at 12° C., said composition, upon installation in porous building materials forming pore-filling foams by chemical reaction, curing, and swelling upon curing by means of the liquid present.

11. The sealing composition according to claim 10 consisting of a mixture of polyurethane prepolymers and at least one other component selected from the group of solvents, water, emulsifiers, or foam stabilizers.

* * * * *

UNITED STATES PATENT AND TRADEMARK OFFICE
CERTIFICATE OF CORRECTION

PATENT NO.    : 6,572,927 B1  Page 1 of 1
DATED         : June 3, 2003
INVENTOR(S)   : Pleyers et al.

It is certified that error appears in the above-identified patent and that said Letters Patent is hereby corrected as shown below:

<u>Title page,</u>
Item [22], should correctly read:
-- [22]  PCT Filed:     June 23, 1999 --

Signed and Sealed this

Third Day of February, 2004

JON W. DUDAS
*Acting Director of the United States Patent and Trademark Office*